United States Patent [19]

Koll et al.

[11] 4,329,145

[45] May 11, 1982

[54] PROCESS FOR PRODUCING LIQUID DYESTUFF PREPARATIONS

[75] Inventors: Jochen Koll, Odenthal; Hans-Heinz Mölls, Leverkusen; Reinhold Hörnle, Cologne; Erhard Schuffenhauer, Leverkusen; Horst Brandt, Odenthal; Fritz Bremer; Karlheinz Wolf, both of Leverkusen; Willy Schiwy, Monheim, all of Fed. Rep. of Germany

[73] Assignee: Bayer Aktiengesellschaft, Leverkusen, Fed. Rep. of Germany

[21] Appl. No.: 176,388

[22] Filed: Aug. 8, 1980

[30] Foreign Application Priority Data

Aug. 29, 1979 [DE] Fed. Rep. of Germany ....... 2934949

[51] Int. Cl.$^3$ ..................... C09B 67/54; C09B 67/04; B01D 31/00
[52] U.S. Cl. ................................. 8/527; 106/288 Q; 210/650; 210/651
[58] Field of Search ................... 8/527, 528; 210/650, 210/651; 106/288 Q

[56] References Cited

U.S. PATENT DOCUMENTS 3,156,520 11/1964 Blaisdell ................................. 8/527
4,062,771 12/1977 Saupe ................................... 210/650
4,094,634 6/1978 Becker et al. .......................... 8/527

FOREIGN PATENT DOCUMENTS 1359898 7/1974 United Kingdom .
1438118 6/1976 United Kingdom ................... 8/527
366213 3/1973 U.S.S.R. ................................ 8/528

*Primary Examiner*—Maria Parrish Tungol
*Attorney, Agent, or Firm*—Sprung, Horn, Kramer & Woods

[57] ABSTRACT

Highly concentrated liquid preparations of disperse dyestuffs are obtained with a low consumption of energy by first adding a dispersing agent to the water-moist dyestuff press-cake to convert it into a form in which it is capable of flow, subjecting this product to wet grinding and increasing the dyestuff content of the resulting, insufficiently concentrated dispersion in a second step by means of a membrane separation process, for example pressure permeation.

9 Claims, No Drawings

PROCESS FOR PRODUCING LIQUID DYESTUFF PREPARATIONS

The invention relates to a process for producing concentrated liquid finished forms, which are stable to storage, of dyestuffs which are sparingly soluble or insoluble in water, that is to say dyestuffs containing no groups which render them water-soluble, by a membrane separation method.

Such preparations have hitherto been produced on an industrial scale by adding customary dispersing agents and formulating agents to the water-moist dyestuff press-cakes and then subjecting the product to wet grinding.

However, this proven method also presents considerable difficulties if the dyestuff separates out, during synthesis, in very small particles which are difficult to filter. Press-cakes with dyestuff contents of only 5–50% are then obtained within economically acceptable filtration times.

In these cases, the dyestuff dispersion, to which dispersing agents have been added if appropriate, either had to be concentrated by means of heat or had to be evaporated completely to dryness and then redispersed. Apart from the fact that these methods necessitate a high consumption of energy and some dyestuffs do not survive such exposure to heat without damage, and the fact that inert drying must be carried out for safety reasons, these processes have a number of other serious disadvantages. Thus, for example, aggregation and in some cases coarsening of the crystals are regularly to be observed during concentration or drying, and these processes can only be reversed by expensive comminution operations. Moreover, troublesome dust problems arise during grinding of the dyestuff press-cake which has been evaporated to dryness and whilst the dyestuff powder is made into a slurry again.

Processes are also already known for desalinating and concentrating aqueous dispersions of sparingly soluble or insoluble dyestuffs by membrane separation methods. Thus, for example according to German Auslegeschrift No. 2,204,725 (corresponding to British Patent Specification No. 1,359,898), dyestuff press-cakes are made into a slurry with water and the slurry is then passed over a semi-permeable membrane, which allows the water and salts, but not the fine dyestuff particles, to pass through. However, this process has the disadvantage that severe sedimentation of the dyestuffs occurs in the flow channels of the membrane separation equipment and blockages arise.

According to German Offenlegungsschrift No. 2,358,080 and German Offenlegungsschrift No. 2,643,214, water-insoluble azo dyestuffs are prepared by diazotisation and coupling in the presence of anionic or nonionic dispersing agents and the salts formed during the reaction are. then removed by a membrane separation method. These are also not optimum processes, since they require a high consumption of water and are time-consuming.

It has now been found that concentrated liquid dyestuff preparations, which are stable to storage, are obtained from press-cakes containing a large quantity of water by a process which avoids the disadvantages described above, if the press-cakes are subjected to wet grinding in the presence of dispersing agents and the product is then concentrated to a higher dyestuff content by means of membrane separation methods.

Suitable dyestuffs for use in the process according to the invention are any dyestuffs which are sparingly soluble or insoluble in water, such as disperse dyestuffs, disperse brighteners, vat dyestuffs and pigments, which can belong to the most diverse structural classes.

The new process is preferably applied to those anthraquinone disperse dyestuffs which, when prepared, are obtained in an amorphous form and, during isolation, cannot be pressed off to concentrations which are anywhere near high enough for concentrated liquid products suitable for the market to be prepared directly from the filter press-cakes.

Possible dispersing agents are all the customary anionic and non-ionic dispersing agents, except for in the case of finished forms of pigments, where only non-ionic compounds are employed.

Dispersing agents which have already been subjected to a membrane separation process beforehand are preferably used. The low-molecular constituents, which are frequently not very effective, of the dispersing agent and also inorganic salts, which have a marked adverse effect on the stability of the dispersion, are separated off by this preliminary process (compare, for example, German Auslegeschrift No. 14 69 606=British Patent Specification No. 1,043,490).

Non-ionic dispersing agents which are employed are, preferably, ethylene oxide adducts or propylene oxide adducts of 3 to 50 mols of ethylene oxide or propylene oxide and alcohols, alkylphenols, carboxylic acids or amines (see Schönfeldt, Oberflächenaktive Anlagerungsprodukte des Äthylenoxids (Surface-active Addition Products of Ethylene Oxide), pages 18 to 57 (1959)). Oxyalkylation products of condensation products of $C_6$–$C_{12}$-alkylphenols, cyclohexylamine and formaldehyde and of styrene or its derivatives and phenol are particularly preferred. Examples of anionic dispersing agents are: sulphated alkylene oxide adducts, sulphated partially esterified polyhydric alcohols, alkylsulphonates, sodium dialkylsulphosuccinates, alkylbenzenesulphonates, condensation products of naphthalenesulphonic acids and formaldehyde, lignin-sulphonates and oxylignin-sulphonates and condensation products of ditolyl ether, formaldehyde and sulphuric acid, or condensation products of m-cresol, 2-naphthol-6-sulphonic acid, formaldehyde and sodium sulphate.

When the new process is carried out in practice, a procedure is appropriately followed in which the dyestuff press-cake is made into a slurry, using a high-speed stirrer, with an amount of dispersing agent such that the slurry is obtained in a form in which it is readily capable of flow. Further amounts of dispersing agent can then be added before, during or after wet comminution, it being necessary to take into consideration the loss of active substance during concentration in the case of dispersing agents which have not been subjected to membrane separation treatment.

In the case of disperse dyestuffs and brighteners and vat dyestuffs, the press-cakes are "liquefied", with high-speed stirring, after adding 1–100%, preferably 5–50%, of dispersing agent, relative to the dyestuff content of the press-cake. Further amounts of dispersing agent can then be added. However, it is expedient to add the entire amount of dispersing agent required for the stability of the dispersion, that is to say 10–200%, preferably 15–100%, before the wet comminution.

Pigment press-cakes are finished by adding 5–10% of non-ionic dispersing agent, relative to the pigment content of the press-cake, to "liquefy" the press-cake, with high-speed stirring, and, if necessary, increasing the amount of dispersing agent to 10% after preliminary comminution and subsequent wet grinding.

Preliminary comminution can be carried out, for example, in millstone-type and gear-type colloid mills. In addition to the colloid mills, it is also possible to use vibratory mills and ball mills, vibromills, dissolvers and sub-micron dispersers as high-pressure dispersing units in the subsequent wet comminution.

However, continuously operating stirred mills with grinding bodies, preferably grinding bodies of $SiO_2$ of 0.2–5 mm diameter, are preferably used.

After the grinding treatment, the stable but inadequately concentrated dispersion is concentrated by means of a membrane separation process.

Such membrane separation processes are described in detail in the literature, for example in U. F. Franck, Dechema Monograph 75, 1452 to 1485, 9/37 (1974), as reverse osmosis, ultrafiltration, dialysis or electrodialysis.

Pressure permeation, that is to say reverse osmosis and ultrafiltration, in which passage of water and any dissolved substances through the semi-permeable membrane takes place under the driving force of a hydrostatic pressure in excess of the osmotic pressure, is preferably applied.

The pressure permeation for the process according to the invention can be carried out in all the commercially available pressure permeation equipment. Such equipment can take the form of, for example, a plate, frame, tube, hose, hollow fibre or fine hollow fibre module. Membranes which can be used according to the invention and can be incorporated into the moduli described above are, for example, membranes of cellulose, cellulose diacetate or triacetate or synthetic polymers, such as, for example, polyamides, polyolefines and polysulphones. Membranes of porous glass or "dynamic membranes" formed from heavy metal oxides and partly water-soluble polymers, such as, for example, polyacrylic acid, can also be used. Membranes of the above-mentioned type are described, for example, in U. F. Franck (see page 5) and Hwang and Kammermeyer, Membranes in separations (Techniques of Chemistry) volume 7, 1975, Wiley, New York.

The membranes used retain most, and preferably all, of the finely divided dyestuff or brightener.

Such membranes have a "cut off level" of molecular weight (MW) 1,000–1,000,000. Membranes with a "cut off level" of about MW 5,000 to about 20,000 are preferably employed.

The pressure permeation is preferably carried out under pressures of between 0.5 and 60 bars. With regard to the membranes, the pH value and the temperature at which the separation process is carried out are not critical, since suitable membranes are available for all pH ranges and temperature ranges.

After the liquid dyestuff preparation has been concentrated, precise adjustment of the tinctorial strength is also carried out with, for example, water, hydrotropic substances, such as ethylene glycols, glycerol and the like, preservatives, wetting agents and anti-foaming agents, inter alia, if these substances have not already been added at an earlier point in time. These substances can be added, for example, before the membrane separation process. It is then possible to end the concentration precisely at the desired tinctorial strength.

The concentrated and stable liquid dyestuff preparations obtained by the process according to the invention can be used in many ways.

The preparations of disperse dyestuffs and disperse brighteners are suitable for dyeing polyester, polyamide 6, polyamide 6,6, polyacrylonitrile, cellulose 2½-acetate and cellulose triacetate materials in the form of woven fabrics, knitted fabrics, mesh fabrics, muffs, tows, wound packages and bobbins, as filaments, plugs, flock and yarn and the like, and they can be applied by the customary dyeing processes.

The pigment dispersions are suitable for the preparation of emulsion paints based on polyvinyl acetate, polyvinyl acetate copolymers, styrene/butadiene copolymers and the like, and for the preparation of wallpaper paints based on cellulose derivatives and for the preparation of printing inks for paper and for textile printing.

EXAMPLES

EXAMPLE 1

6,000 g of a water-moist press-cake of 1,4-diamino-2-phenylsulphonylanthraquinone with a solids content of 40.8% are converted into a form which is capable of flow with 1,249 g of ultrafiltered lignin-sulphonic acid, whilst stirring. The entire suspension is subjected to wet comminution by 4 passes through a bead mill. The mill is then rinsed with 1,000 g of water, which is combined with the ground paste so that the resulting dyestuff content of the dispersion is about 31%.

This dispersion is pumped, under 40 bars and at a rate of 600 l/hour, through the module of a laboratory pressure permeation unit with a 0.36 $m^2$ membrane of a polysulphone (separation limit of about MW 6,000) until the dyestuff content of the dispersion is 36%. The average permeate flow density J is 150 $l/m^2d$. The dispersion is then adjusted to a dyestuff content of about 30% with glycerol, as an agent for preventing drying out, and with a preservative.

The quality of the liquid formulation thus prepared corresponds to that of a liquid formulation prepared conventionally, by a troublesome procedure, via intermediate drying in a Venuleth paddle drier.

EXAMPLE 2

8,533.3 g of a press-cake of Disperse Blue 56 (C.I. 63285) with a dyestuff solids content of about 15% are "liquefied" with 1,280 g of ultrafiltered lignin-sulphonic acid (Na salt), whilst stirring. The entire suspension, with a dyestuff content of about 13%, is subjected to wet comminution by 4 passes through a bead mill and combined with 1,000 g of rinsing water from the bead mill, such that the resulting dyestuff content is about 12%. On subsequent pressure permeation, 2,400 $cm^3$ of permeate are taken off from the same unit, with the same membrane and under the same conditions as in Example 1. The average permeate flow density J throughout the entire experiment is 180 $l/m^2d$.

The dyestuff content of the concentrated dispersion is about 15%.

The tinctorial strength is adjusted to that of commercial goods by adding agents for preventing drying out, preservative and a wetting agent, as well as water.

The quality of the liquid formulation thus prepared corresponds to that of a liquid formulation prepared in the customary manner in a "Venuleth" unit.

EXAMPLE 3

A press-cake of brominated 1,8-dihydroxy-4,5-diamine-anthraquinone with a dyestuff content of 18%, to which 75%, relative to the dyestuff content, of ultrafiltered lignin-sulphonic acid has been added, is ground in the same manner as described in Example 2, the product is concentrated to a dyestuff content of about 25% by the membrane separation process, analogously to Example 1, J=200 l/m²d, preservative is then added and the formulation is adjusted to the desired dyestuff concentration with water.

The suspension thus prepared corresponds to that which was obtained, with a far higher expenditure of work, money and energy, by spray-drying and subsequent kneading.

EXAMPLES 4–8

The procedure followed is as described in Example 1. Results which are equally as good as those obtained by the conventional method are produced by pressure permeation, without intermediate drying.

In Examples 5, 6 and 8, the pressure permeation is carried out in the same unit, with the same membrane and under the same conditions as in Example 1. A factory plant with a 19 m² membrane of polysulphone (separation limit about MW 6,000) is used for Examples 4 and 7. The amount circulated for this module is 8.5 m³ under 40 bars.

| Example | Dyestuff Disperse | Press-cake amount (kg) | Press-cake % content of dyestuff | Ultrafiltered lignin-sulphonic acid amount (kg) | Ultrafiltered lignin-sulphonic acid % of the dyestuff content | Amount of permeate removed by pressure permeation (kg) | Dyestuff concentration in % before pressure permeation | Dyestuff concentration in % after pressure permeation | Average permeate flow density (l/m²d) |
|---|---|---|---|---|---|---|---|---|---|
| 4 | Blue 139 | 13,600 | 23.5 | 2,080 | 65 | 3,600 | 20.4 | 26.5 | 150 |
| 5 | Orange 29 | 5 | 18.1 | 0.5 | 60 | 2.0 | 16.4 | 25.7 | 160 |
| 6 | Orange 66 | 6.7 | 18.8 | 0,880 | 70 | 2,500 | 16.2 | 24.8 | 360 |
| 7 | Red 82 | 13,400 | 20.5 | 1,400 | 50 | 4,800 | 18.5 | 27.3 | 290 |
| 8 | Violet 40 | 7.5 | 20.0 | 0,750 | 50 | 3.5 | 18.3 | 31.6 | 150 |

EXAMPLE 9

4,000 g of a press-cake of C.I. Pigment Red 112 with a pigment content of 20% are "liquefied" with the aid of a high-speed stirrer and with the addition of 160 g of a non-ionic dispersing agent which has been prepared by condensation of 1 mol of cyclohexylamine and 1 mol of nonylphenol with formaldehyde and reaction of the product with 28 mols of ethylene oxide, and the "liquefied" product is then ground in a high-speed stirred mill. After a grinding period of one hour, a stable, outstandingly fine dispersion is obtained.

This dispersion is passed, under a pressure of 20 bars, over a membrane with a separation limit of MW 6,000 in a pilot pressure permeation unit. 2,560 g of permeate containing no pigment are removed. 400 g of ethylene glycol are stirred into this pigment dispersion.

2,000 g of a stable pigment dispersion which is readily capable of flow and contains 40% of pigment are obtained.

EXAMPLE 10

4,000 g of a press-cake of C.I. Pigmet Yellow 1 with a pigment content of 24% are "liquefied" with the aid of a high-speed stirrer and with the addition of 200 g of a non-ionic dispersing agent prepared by condensation of 2.7 mols of vinyl toluene with 1 mol of phenol and subsequent reaction of the product with 28 mols of ethylene oxide, and the "liquefied" product is then ground in a high-speed stirred mill. After a grinding period of 30 minutes, a stable, outstandingly fine dispersion is obtained.

This dispersion is passed, under a pressure of 20 bars, over a membrane with a separation limit of MW 20,000 in a pilot pressure permeation unit. 2,200 g of pigment-free permeate are removed. After stirring in 582 g of ethylene glycol, a further 582 g of permeate, also free from pigment, are removed.

2,000 g of a stable pigment dispersion which is readily capable of flow and contains about 40% of pigment are obtained.

We claim:

1. Process for producing concentrated liquid dyestuff preparations of dyestuffs which are sparingly soluble or insoluble in water, comprising in a first step adding a dispersing agent to the water-moist dyestuff press-cake to convert it into a form in which it is capable of flow, subjecting this product to wet grinding and increasing the dyestuff content of the resulting, insufficiently concentrated dispersion in a second step by means of a membrane separation process.

2. Process according to claim 1, wherein the dyestuff content of the dyestuff press-cake is 5–50%.

3. Process according to claim 1, wherein pressure permeation is employed as the membrane separation method.

4. Process according to claim 1, wherein the dyestuff content of the press-cake to which dispersing agents have been added is increased to 15–40% by means of the membrane separation method.

5. Process according to claim 1, wherein disperse dyestuffs, vat dyestuffs or disperse brighteners are employed as the dyestuffs.

6. Process according to claim 5, wherein the dyestuff is
1,4-diamino-2-phenylsulphonylanthraquinone,
Disperse Blue 56 (C.I. 63285) or
brominated 1,8-dihydroxy-4,5-diamino-anthraquinone.

7. Process according to claims 1, 5 or 6, wherein lignin derivatives which have already been subjected to membrane separation treatment beforehand are employed as dispersing agents for finishing the dyestuffs according to these claims.

8. Process according to claim 1, wherein pigments are employed as the dyestuffs.

9. Process according to claims 1 or 8, wherein non-ionic dispersing agents are employed for finishing the pigments.

* * * * *